United States Patent
Morandi

(10) Patent No.: US 10,612,773 B2
(45) Date of Patent: Apr. 7, 2020

(54) BURNER

(71) Applicant: SOFINTER S.p.A., Milan (IT)

(72) Inventor: Lorenzo Morandi, Varese (IT)

(73) Assignee: SOFINTER S.P.A., Milan (IT)

( * ) Notice: Subject to any disclaimer, the term of this patent is extended or adjusted under 35 U.S.C. 154(b) by 693 days.

(21) Appl. No.: 15/121,287

(22) PCT Filed: Mar. 20, 2015

(86) PCT No.: PCT/EP2015/055946
§ 371 (c)(1),
(2) Date: Aug. 24, 2016

(87) PCT Pub. No.: WO2015/154969
PCT Pub. Date: Oct. 15, 2015

(65) Prior Publication Data
US 2017/0016615 A1    Jan. 19, 2017

(30) Foreign Application Priority Data

Apr. 10, 2014 (IT) .............................. MI2014A0679

(51) Int. Cl.
*F23C 9/08* (2006.01)
*F23L 15/04* (2006.01)
*F23C 1/08* (2006.01)

(52) U.S. Cl.
CPC .................. *F23C 9/08* (2013.01); *F23C 1/08* (2013.01); *F23L 15/04* (2013.01); *F23C 2201/301* (2013.01); *F23C 2202/20* (2013.01); *F23C 2900/09002* (2013.01);
(Continued)

(58) Field of Classification Search
USPC .................................................. 431/115, 116
See application file for complete search history.

(56) References Cited

U.S. PATENT DOCUMENTS

| 3,174,526 A | 3/1965 | Von Linde |
| 3,319,692 A | 5/1967 | Imants et al. |
| 4,130,388 A | 12/1978 | Flanagan |

(Continued)

FOREIGN PATENT DOCUMENTS

| DE | 10 2005 008421 A1 | 8/2006 |
| EP | 1 203 188 A1 | 5/2002 |

(Continued)

OTHER PUBLICATIONS

International Search Report and Written Opinion issued in PCT/EP2015/055946 dated May 22, 2015.

*Primary Examiner* — Edelmira Bosques
*Assistant Examiner* — Deepak A Deean
(74) *Attorney, Agent, or Firm* — Arent Fox LLP

(57) ABSTRACT

A burner operating with flameless combustion, comprising a system for sucking the recycling flue gases directly from the combustion chamber by means of an ejector fed with the comburent, a heat exchange system positioned between the recycling flue gases and the comburent, a system for injecting the fuel directly into the recycling flue gases, the latter comprising or not comprising the comburent with formation of a mixture of fuel-recycling flue gases-comburent in the zone around the outlet of the comburent ejector and following introduction of the mixture into the combustion chamber.

14 Claims, 8 Drawing Sheets

(52) U.S. Cl.
CPC ... *F23C 2900/99001* (2013.01); *Y02E 20/342* (2013.01); *Y02E 20/348* (2013.01)

(56) References Cited

U.S. PATENT DOCUMENTS

| | | | | |
|---|---|---|---|---|
| 4,347,052 A | * | 8/1982 | Reed | F23C 6/047 |
| | | | | 431/188 |
| 4,575,332 A | | 3/1986 | Oppenberg et al. | |
| 5,238,395 A | * | 8/1993 | Schwartz | F23C 9/006 |
| | | | | 431/10 |
| 5,269,678 A | * | 12/1993 | Schwartz | F23C 6/047 |
| | | | | 431/116 |
| 5,269,679 A | | 12/1993 | Syska et al. | |
| 5,413,477 A | * | 5/1995 | Moreland | F23C 6/045 |
| | | | | 431/116 |
| 5,460,512 A | * | 10/1995 | Lifshits | F23C 6/047 |
| | | | | 431/115 |
| 5,503,548 A | * | 4/1996 | Franke | F23C 6/04 |
| | | | | 431/10 |
| 5,573,391 A | * | 11/1996 | Benson | F23C 6/047 |
| | | | | 431/115 |
| 5,636,977 A | * | 6/1997 | Benson | F23C 6/047 |
| | | | | 431/115 |
| 6,293,275 B1 | | 9/2001 | Wünning | |
| 10,281,140 B2 | * | 5/2019 | Robertson | F23C 9/08 |
| 2002/0197574 A1 | * | 12/2002 | Jones | F23C 6/047 |
| | | | | 431/8 |
| 2005/0053877 A1 | * | 3/2005 | Feese | F23C 6/045 |
| | | | | 431/10 |
| 2005/0239005 A1 | | 10/2005 | Lugnet et al. | |
| 2006/0057516 A1 | * | 3/2006 | Miller | F23C 3/002 |
| | | | | 431/8 |
| 2006/0240370 A1 | * | 10/2006 | Neville | F23C 6/047 |
| | | | | 431/12 |
| 2012/0186265 A1 | | 7/2012 | Hase et al. | |
| 2014/0272736 A1 | * | 9/2014 | Robertson | F23C 6/047 |
| | | | | 431/12 |

FOREIGN PATENT DOCUMENTS

| | | |
|---|---|---|
| JP | S50-69631 A | 6/1975 |
| JP | S52-90743 U | 7/1977 |
| JP | S53-76333 U | 6/1978 |
| JP | H09-145013 A | 6/1997 |
| WO | 0 893 651 A1 | 1/1999 |
| WO | WO 01/07833 A1 | 2/2001 |

* cited by examiner

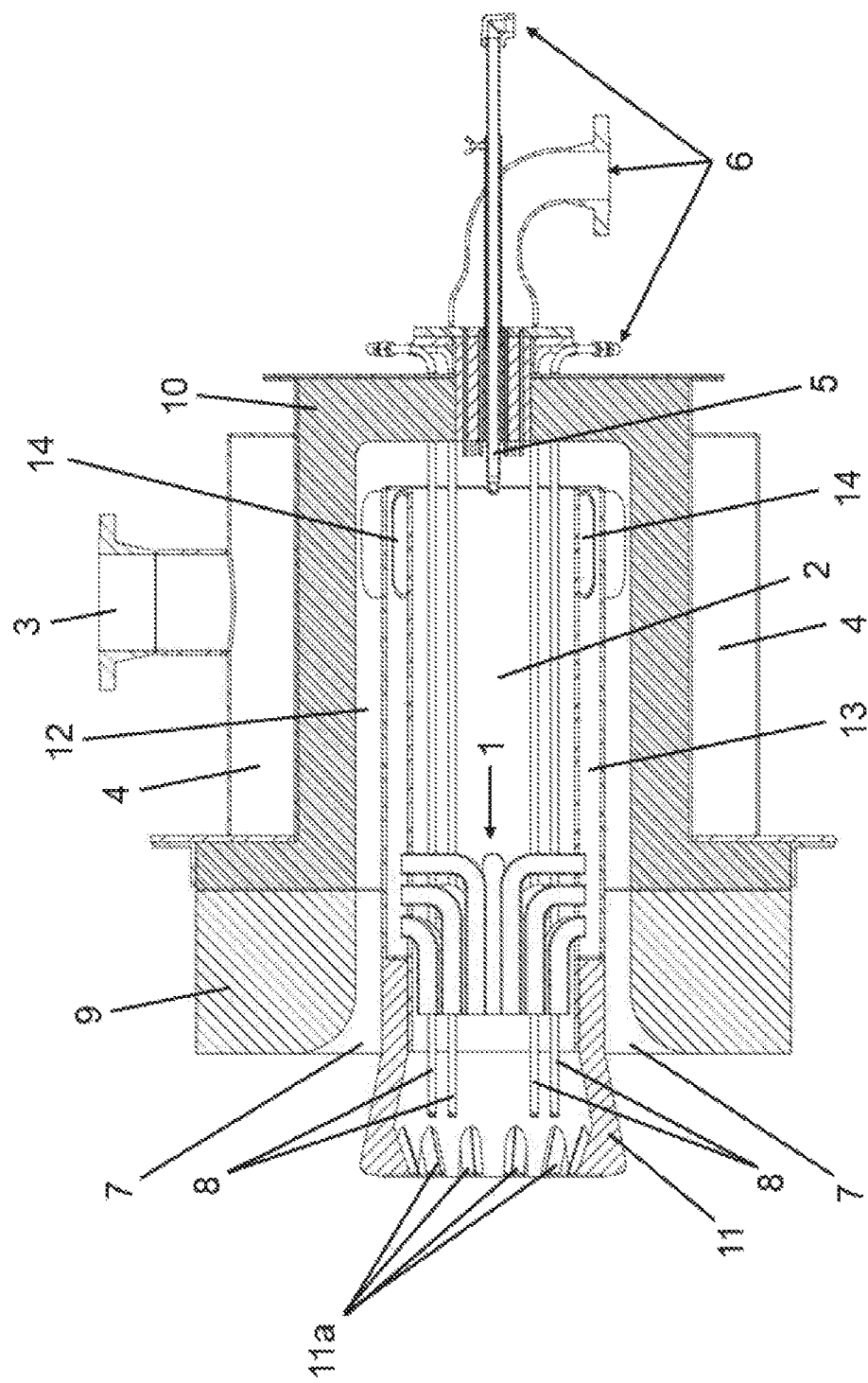

BURNER

CROSS-REFERENCE TO RELATED APPLICATIONS

This application is a National Stage entry of International Application No. PCT/EP2015/055946, filed Mar. 20, 2015, which claims priority to Italian Patent Application No. MI2014A000679, filed Apr. 10, 2014. The disclosure of the prior applications are hereby incorporated in their entirety by reference.

The present invention relates to a burner for fuels and its working process.

Burners are devices for producing heat for various industrial applications, such as industrial boilers for producing steam or electric power, furnaces for the melting of metals, etc.

The combustion in burners generally takes place by a flame and liquid, solid or gaseous fuels are fed by means of suitable devices so to obtain a controlled combustion.

A flame burner of the prior art is shown in FIG. 5, in a schematic longitudinal section view. In the FIG. 23 is the internal part of the burner, 21 the fuel injector or fuel injection nozzle, 22 the flame stabilizer, 20 the fuel feeding nozzle, 24 the burner jacket. In the Figure the white arrows show the flow of the comburent, generally air. The figure in particular shows that the comburent flow inside the burner is deflected by the flame stabilizer 22, so as to get mixed downstream the nozzle with the fuel (represented by the black arrows) injected through the injection nozzle 21. On the left of the vertical line 25 there is a combustion chamber, not reported in the figure, wherein the combustion process, triggered by a flame, takes place. These burners of the prior art have several drawbacks: the flame front does not ensure an homogeneous combustion and it must be used an excess of comburent to ensure the complete combustion of the fed fuel. Furthermore inside the combustion chamber the formation of thermal peaks cannot be avoided. In any case in these burners of the prior art polluting emissions are produced. In addition the combustion efficiency is limited as it is necessary to operate, as said, with an excess of the air comburent, the excess being as a minimum of 8% by volume, corresponding to a percentage of residual oxygen in flue gases equal to 1.6%. However generally the comburent excess is higher, so to have a percentage of residual oxygen in flue gases of at least 3% by volume.

Patent application US 2012/0186,265 relates to a burner stabilizing the flame of a gas turbine, in particular under low load conditions. In the background it is stated to be known that the jet flames are stabilized by mixing in hot recirculating gases. However during gas turbine operation, in particular at low loads, not always a temperature of the recycling gases suitable to stabilize the flame can be guaranteed. Therefore devices to obtain a jet flame stabilization under these conditions are requested. The above patent application solves this problem, as shown in FIG. 4, by means of a nozzle equipped with an annular gap 8 positioned around the nozzle. The annular gap 8 communicates with the fluid jet 2 through openings placed upstream the outlet section 22 of the nozzle. The recycling gases are sucked and conveyed into the annular gap 8 in the direction opposite to the fluid flow in the nozzle. The recycling gases pass through the openings positioned upstream of the nozzle and mix with the jet fluid inside the nozzle: in this way, according to this patent application, the stabilization of the flame is guaranteed. In order to suck the recycling gases the difference of static pressure existing between the combustion chamber and the fluid flowing at a high speed in the nozzle is used. In another embodiment, see FIG. 5 of the same patent application, a second annular channel 20 is positioned externally and coaxially to the first annular gap 8 to convey air and/or fuel in the burner. In a preferred embodiment the fluid jet is compressed air premixed, or partially premixed or non premixed with the fuel. In low load operation the fluid is preferably formed of a fuel/compressed air mixture. In full load operation the fluid is formed of compressed air containing or not containing fuel. The use of this burner allows to avoid the NO increase produced during the basic load operation, as diffusion stabilization "pilots" (diffusion stabilizers) are not used in order to avoid the flame front fluctuations (combustion chamber hamming). It is in fact well known that these flame stabilizers lead to $NO_x$ increased emissions. In any case also in these burners the produced $NO_x$ amount is high.

The need was felt to have available a fuel burner capable to be operated with different comburents, atmospheric air included, by using a very reduced comburent excess with respect to the prior art, such as to have a combustion reaction balance approaching the stoichiometric, to obtain a higher combustion efficiency and at the same time an uniform distribution of the combustion temperature in the boiler, thus avoiding the formation of zones with high temperature peaks, and to produce fumes with lower polluting emissions, in particular $NO_x$ and CO, with respect to the above described prior art burners.

The Applicant has unexpectedly and surprisingly found a burner solving the technical problem indicated above.

It is an object of the present invention a burner wherein a MILD (Moderate and Intense Low oxygen Diluition) combustion takes place, also known as flameless combustion, comprising systems for sucking the recycling flue gases directly from a combustion chamber by means of an ejector or comburent injection system fed with a comburent, a heat exchange system suitable for heat exchange between the recycling flue gases and the comburent, systems for injecting the fuel directly into the recycling flue gases, the latter comprising or not comprising the comburent, and formation of a mixture of fuel-recycling flue gases-comburent in the zone around the outlet of the comburent ejector and following introduction of the mixture into said combustion chamber.

More in particular reference is made to the exemplary and not limitative Figures attached hereto for a detailed description of the present invention:

FIG. 2a is a longitudinal section view of a burner according to a more preferred embodiment of the present invention;

FIG. 3 is a perspective view showing in detail the comburent circuit of the bumer according to the more preferred embodiment of the burner of FIG. 2a;

Figure 1:
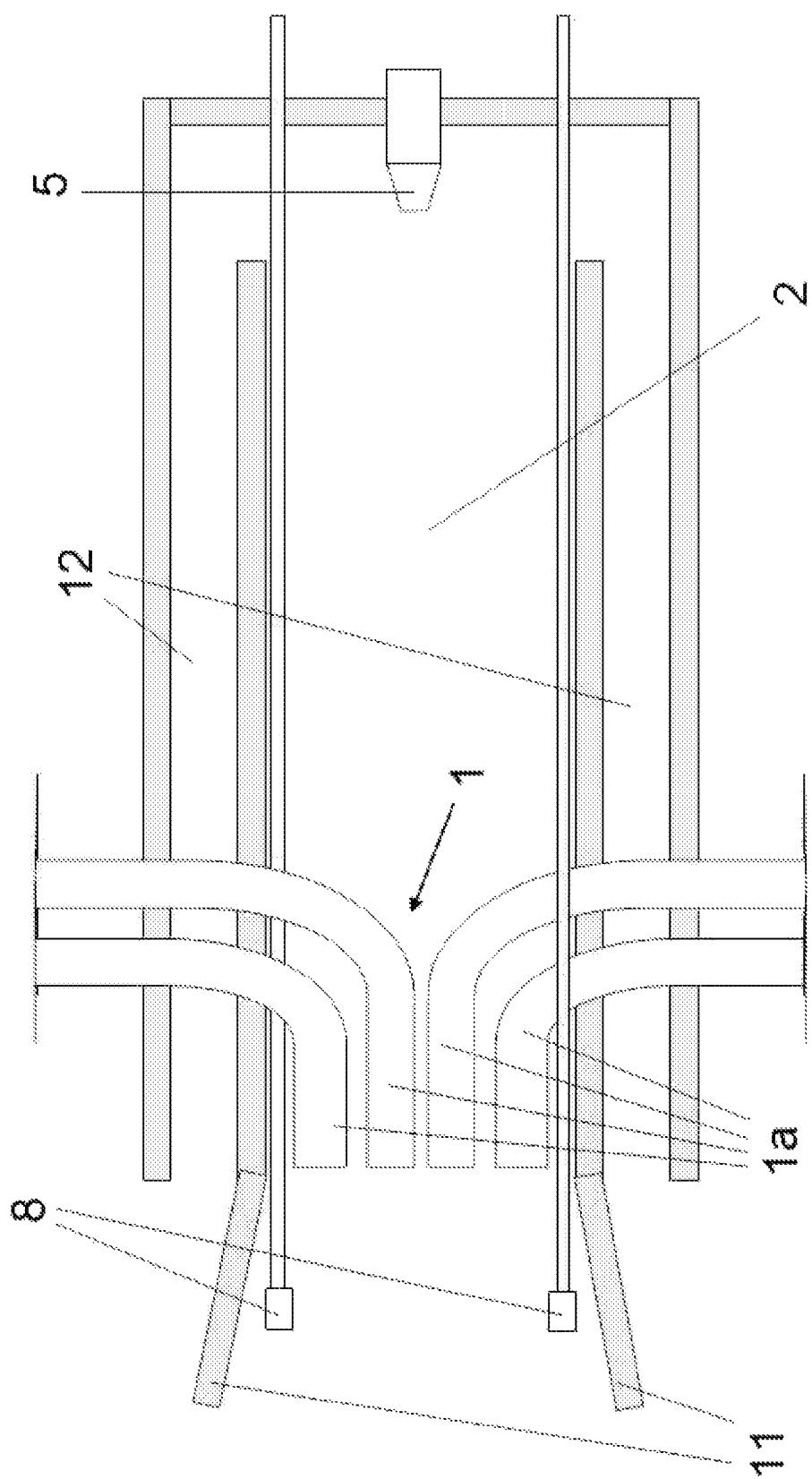
FIG. 1 shows a schematic longitudinal section of a burner according to the present invention.
Figure 4:
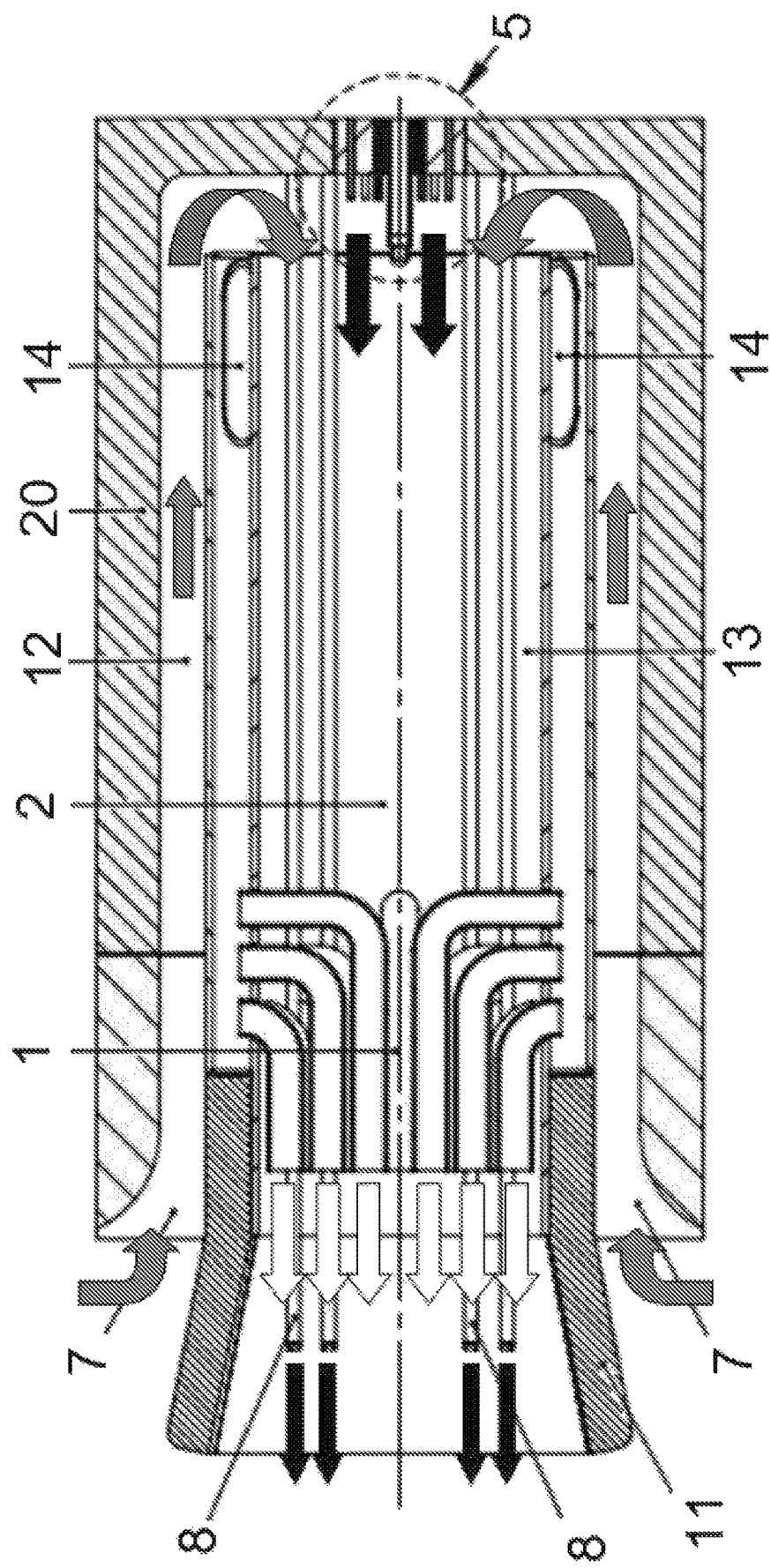
Figure 4A:
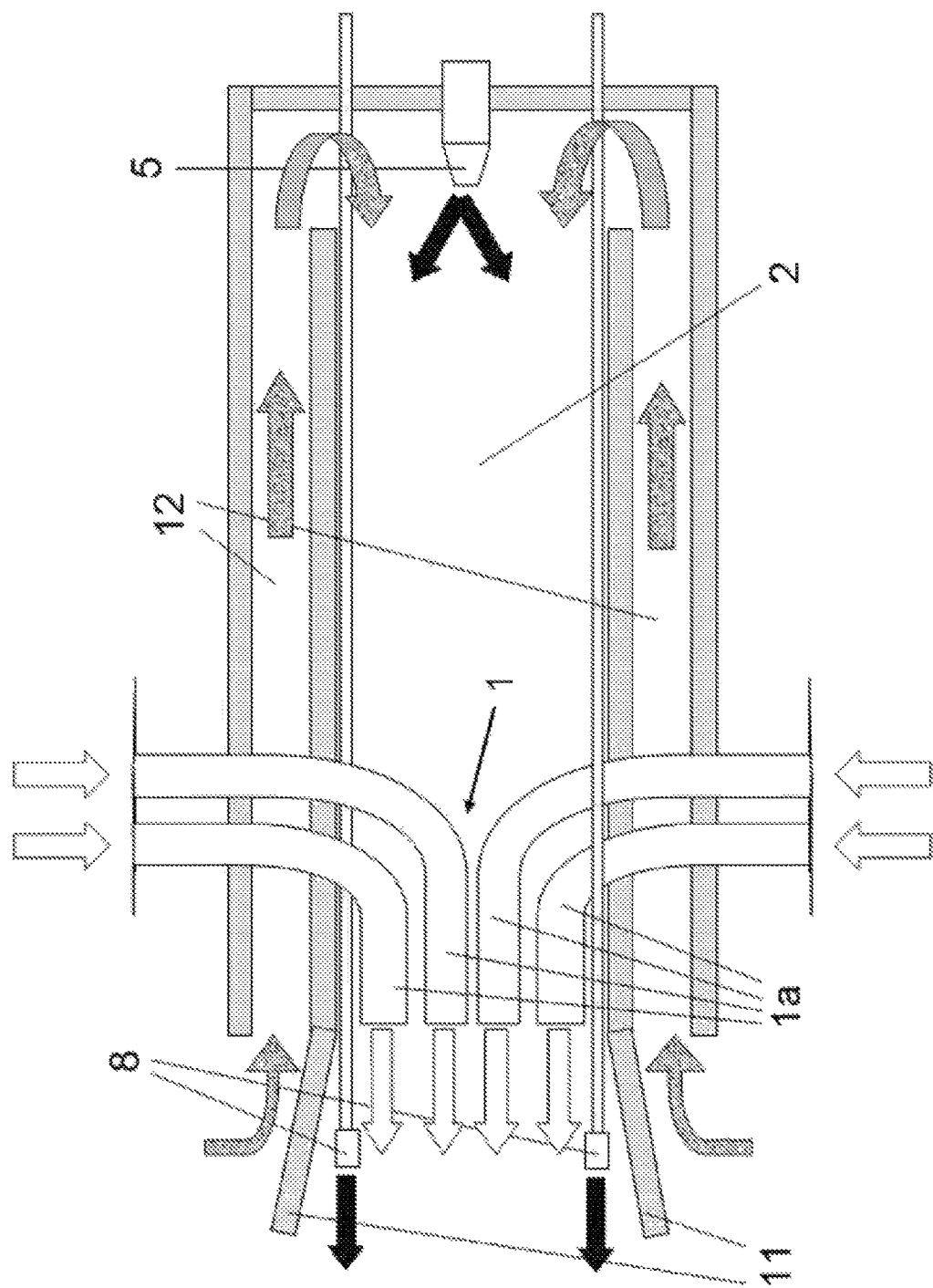
Figure 4B:
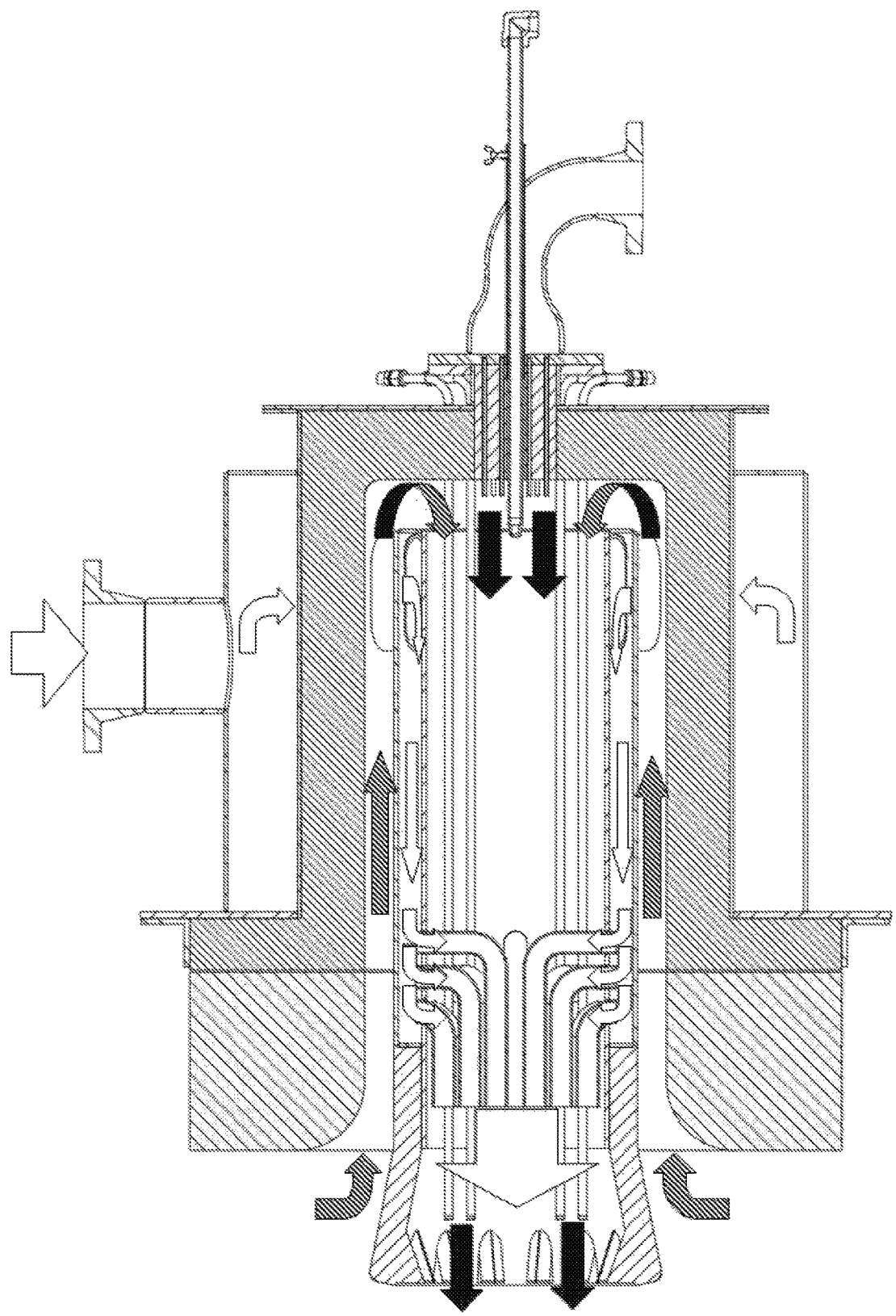
Figure 5:
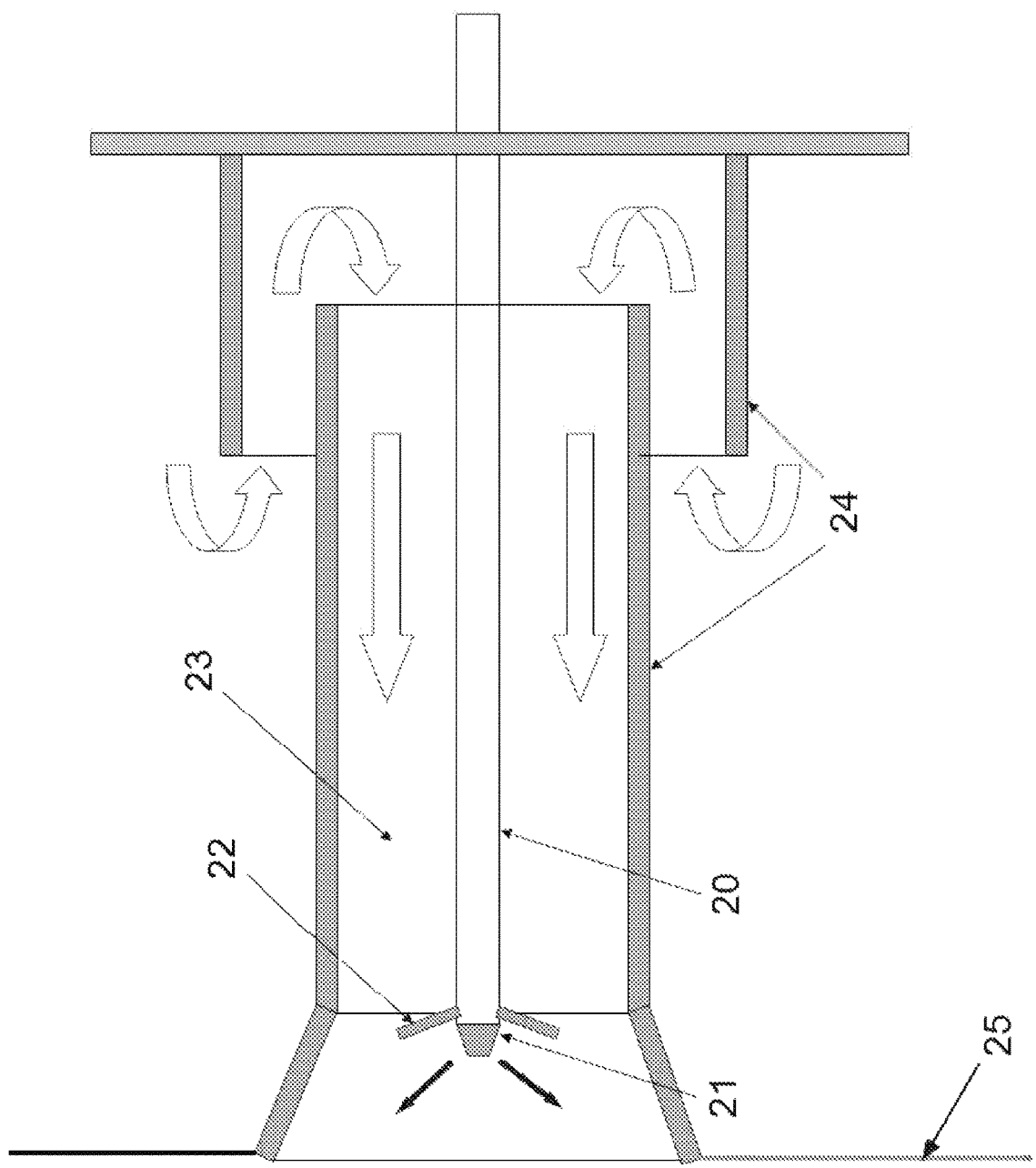

FIG. 4a schematically illustrates the process of operating the burner of FIG. 1;

FIG. 4b schematically illustrates the process of operating a burner of FIG. 2a;

FIG. 5 shows, as mentioned above, a schematic longitudinal section view of a flame burner of the prior art.

Preferably the comburent injection system is arranged in the burner at a different position with respect to those of the fuel injection systems.

A schematic representation of the burner of the present invention in a longitudinal section is reported in FIG. 1, wherein 12 is the annular duct comprised in the sucking system of the recycling flue gases directly from the combustion chamber, 2 the transit or mixing chamber, 5 and 8 the fuel injection system, 1 is the ejector fed with the comburent, or injection system 1, formed of tubes 1a parallel among them in their outletting parts toward the outlet cone 11, 11 the burner outlet cone.

The systems for sucking the recycling flue gases comprises, besides the annular duct 12, also the suction intakes for sucking the recycling flue gases from the combustion chamber, not represented in FIG. 1, positioned anteriorly with respect to the annular duct 12.

In FIG. 1 the combustion chamber, not represented, is located at the left of the outlet cone 11 and is in communication with the suction intakes of the sucking system of the recycling flue gases.

In the burner of the present invention the comburent is the entraining or driving fluid and the recycling flue gases, or combustion fumes, are the entrained fluid.

The heat exchange system of the burner, not reported in FIG. 1, is formed of the conduit walls delimiting the comburent flow that have a surface, or portion thereof, in contact with the recycling flue gases; the comburent flow being in countercurrent with respect to the inletting flue gases flowing into the annular duct 12.

The Applicant has unexpectedly and surprisingly found that by operating with the burner of the present invention a combustion with high efficiency is obtained and the flue gases outletting the burner show very low amounts of pollutants, in particular CO and $NO_x$, lower in the confront of the burners of the prior art. This is completely unexpected in view of the above mentioned prior art.

More particularly the burner comprises an annular duct 12, a heat exchange system suitable for heat exchange between the recycling flue gases and the comburent, systems for injecting the fuel directly into the recycling flue gases both inside and outside the transit chamber 2, that are coaxial to the outletting parts of the tubes 1a forming the ejector, with formation in the zone around the front section of the outletting parts of the tubes 1a forming ejector 1, of a mixture of fuel-recycling flue gases-comburent and following introduction of the mixture into the combustion chamber.

The front section of the outletting parts of the tubes 1a forming ejector 1 are called also outletting front section of ejector 1 or front section of ejector 1.

Preferably the burner of the invention has a structure whereby the annular duct 12, the heat exchange system between the recycling flue gases and the comburent and the transit chamber 2 are substantially coaxial with respect to the longitudinal or symmetry axis of the burner.

In the following description by "anterior" or "anteriorly" it is meant the part of a burner component toward or situated toward the combustion chamber. By "posterior" or "posteriorly" the opposite.

It is hereinbelow reported the detailed description of each of the above Figures.

Figure 2:
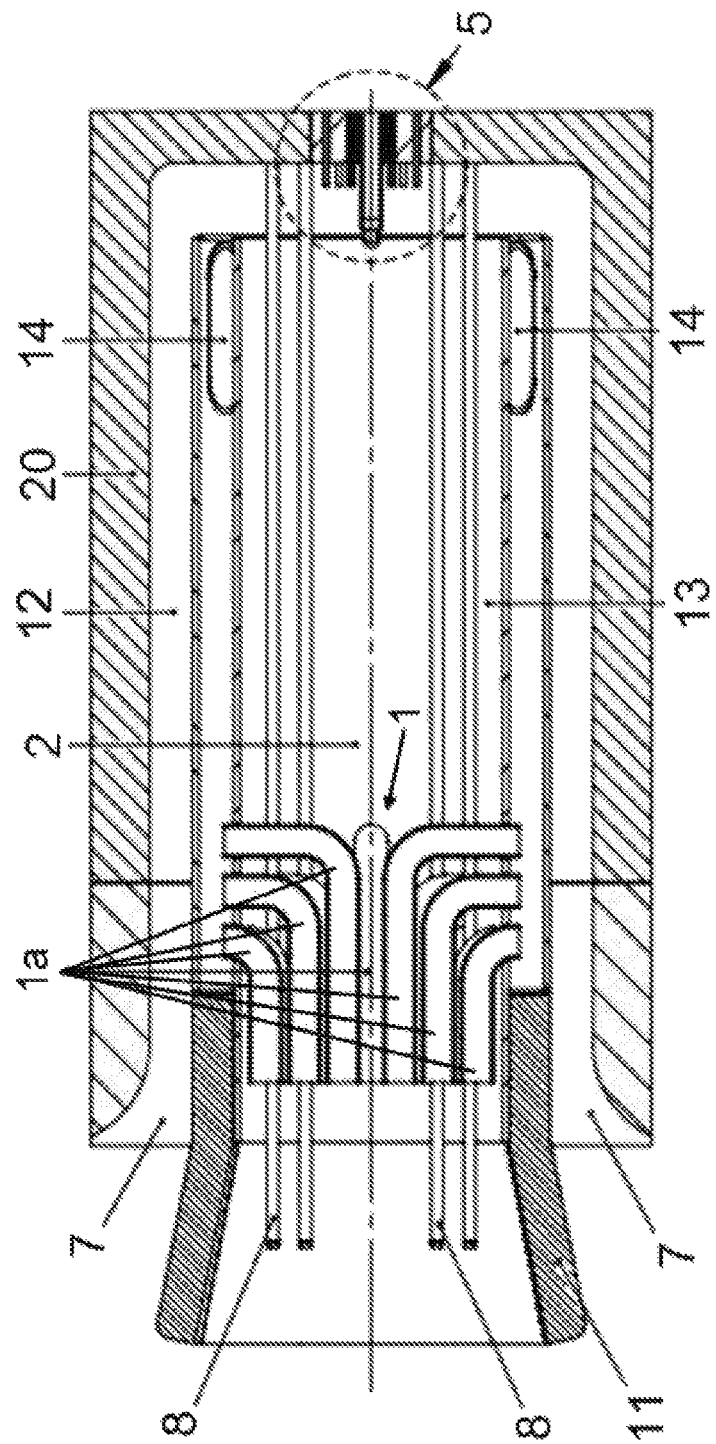
FIG. 2 is a logitudinal section view of a burner according to a peferred embodiment of the present invention.

FIG. 2 is a scheme of a burner comprising suction intakes 7 for sucking the recycling flue gases from the combustion chamber, an annular duct 12, a comburent annular distribution chamber 13, radial ducts 14, the outlets of which are represented (the radial ducts 14 are represented in full in FIG. 3), a transit chamber 2, fuel injection systems 5 and 8, an ejector 1 of the comburent, an outlet cone 11, a case 20;

wherein the annular duct 12, that is in communication through the suction intakes 7 with said combustion chamber, delimits externally and posteriorly the annular distribution chamber 13;

the annular distribution chamber 13 anteriorly is in communication with ejector 1 and posteriorly with the radial ducts 14 and delimits externally the transit chamber 2;

the transit chamber 2 is anteriorly delimited by the outletting front section of ejector 1 and posteriorly by the wall of the case 20;

the outletting front section of ejector 1 is perpendicular with respect to the distribution chamber 13 that anteriorly is in contact with the outlet cone 11 or protruding cone 11; the fuel injection system 5 is positioned on the back wall of case 20 of the burner upstream of the ejector 1, the fuel injection system 8 is positioned downstream of the outletting front section of ejector 1; wherein the recycling flue gases, directly sucked from said combustion chamber through the suction intakes 7, flow through the annular duct 12 and heat the comburent flowing in countercurrent into the annular distribution chamber 13, and the recycling flue gases enter the transit chamber 2 and driven by the depression created by the comburent outletting the front section of ejector 1, they mix with the comburent downstream the outletting front section of ejector 1, the comburent being the entraining or driving fluid and the recycling flue gases the entrained fluid, the fuel being directly injected upstream ejector 1 into the recycling flue gases by the injection system 5 and/or downstream the outletting front section of ejector 1 by the injection system 8 into the comburent-recycle-flue gas mixture, in the latter case the recycle flue gas contain already fuel when injection system 5 is also used.

Preferably the fuel is fed to the burner by the injection system 5.

In fact it has been unexpectedly and surprisingly found that by operating with the injection system 5 the combustion flue gases show an even lower content of the pollutants CO and $NO_x$.

The fuel injection system 5 is preferred also when the fuels fed to the burner are liquid fuels.

Preferably the outlet cone 11, the suction intakes 7, the annular duct 12 and the comburent annular distribution chamber 13 are circumferentially and longitudinally positioned around the burner longitudinal axis, represented in FIG. 2 by the segmented line dividing the burner in two simmetrical parts.

Preferably the transit chamber 2 is positioned along the burner longitudinal axis.

In FIG. 2 the heat exchange system between the recycling flue gases and the comburent is substantially formed by the walls of the radial ducts 14, of the annular distribution chamber 13 and of the tubes 1a forming the ejector 1, said walls separating the comburent flow from the recycling flue gas flow.

The ejector 1 placed as said with its ouletting front section perpendicular with respect to the annular distribution chamber 13, is preferably positioned along the longitudinal axis of the burner in order to have a good fluid dynamics.

The ejector 1 comprises tubes 1a having inlets connected to the comburent distribution chamber 13 and radially positioned thereto; the outletting parts of said tubes 1a, or nozzles, are parallel to the longitudinal axis of the burner and with their outlets directed towards the outlet cone 11. Said outletting parts are preferably coaxially and circularly positioned with respect to the burner longitudinal axis.

The injection fuel systems 5 and 8 can include more injectors, preferably multi-nozzle, positioned along and around the burner longitudinal axis.

Preferably the fuel injectors of the injection system 8 are circularly placed around the burner longitudinal axis and positioned at the end of tubes arranged preferably parallel to the burner longitudinal axis, that from the back wall of case 20 of the burner longitudinally cross the transit chamber 2 and the outletting front section of the comburent ejector 1.

The injector system 5, positioned on the back wall of the case 20 of the burner, is arranged on the burner longitudinal axis and circularly thereto.

Case 20 is typically formed of metal or steel or ceramic material, refractory or ceramic lined in its inner part towards the burner axis.

The outlet cone 11 is formed of refractory or ceramic material.

The refractory material used is preferably of the aluminous type containing chromium and/or zirconium, and it generally contains, as percent by weight, about 10% chromium and about 4% zirconium.

The outletting front section or front section of ejector 1 is the plane that comprises the perimetral edges of tubes 1a toward the outlet cone 11.

FIG. 2a illustrates a more preferred embodiment of the burner according to the present invention, further comprising the following parts: an adduction flange 3 of the comburent, an annular feeding drum 4 of the comburent, adduction flanges 6 of the fuel to the injector system 5.

In FIG. 2a muffle 9 and jacket (mantle) 10 form the case 20 of FIG. 2 (not represented in FIG. 2a).

The muffle 9 and the annular feeding drum 4 are preferably circularly and longitudinally positioned around the burner longitudinal axis (not represented in FIG. 2a).

Preferably the suction intakes 7 are delimited externally by muffle 9. Generally muffle 9 is fixed (joined to the boiler wall) and allows to disconnect the burner from the boiler.

The jacket 10 and the muffle 9 are made of the same materials indicated for the case 20.

The adduction flanges 6 are positioned externally with respect to the back wall of case 20 of the burner and are in communication with the fuel injection system 5.

Figure 3:
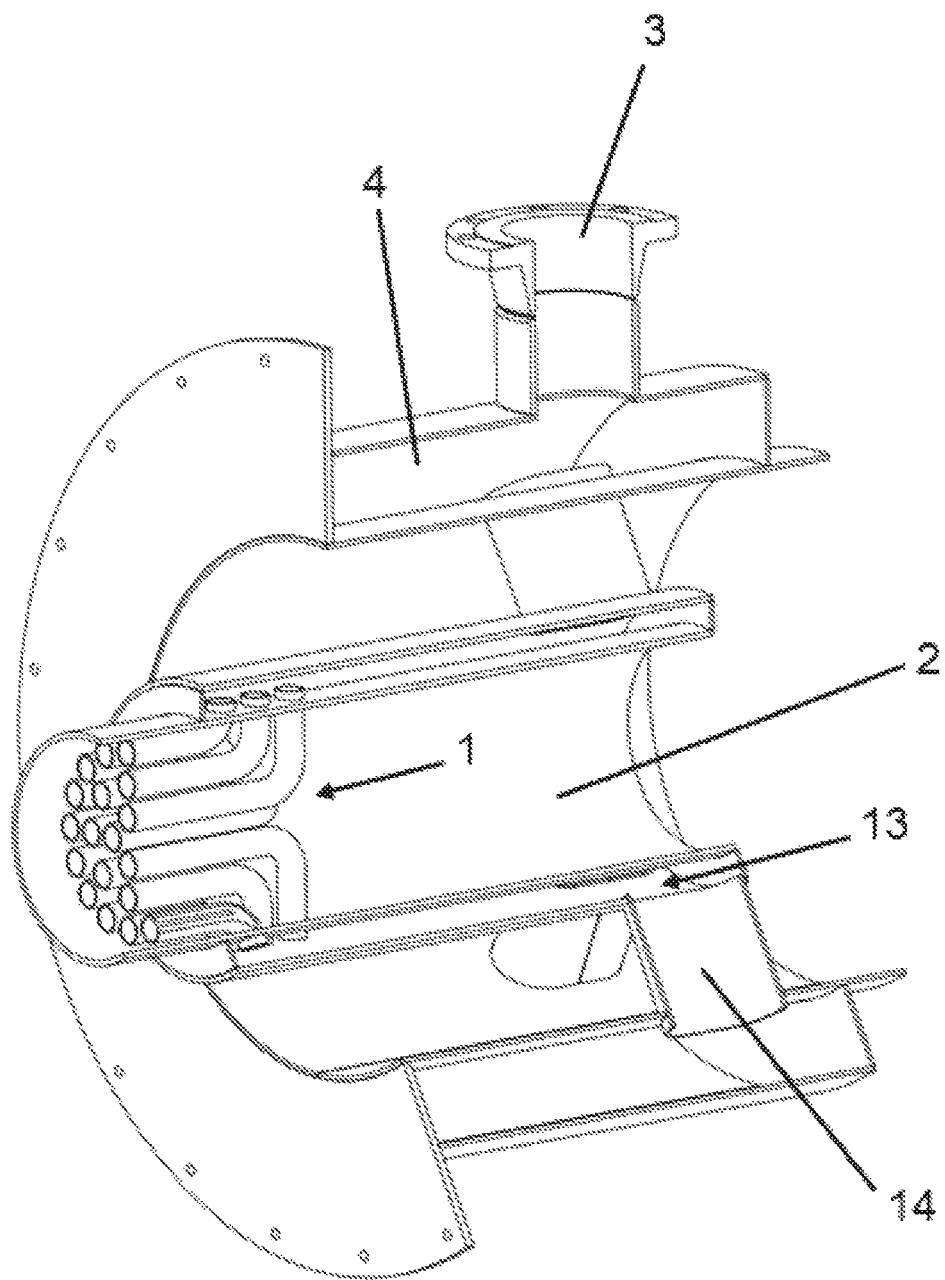

Flange 3 provides the comburent inlet into the annular feeding drum 4, the latter being connected with the fuel annular distribution chamber 13 through the radial ducts 14, as shown in FIG. 3.

By circular longitudinal arrangement of a burner component it is meant that the component has a shape substantially similar to that of a cylindrical shell having the longitudinal axis in the direction of the burner axis.

The outlet cone 11 is positioned downstream of the ejector 1 of the comburent to confine the aerodynamic flow of the combustion gas in the outletting front section of injector 1. The outlet cone 11 in its front end part is preferably equipped with aerodynamic turbolators 11a, some of which are shown in FIG. 2a.

The outlet cone 11 and the muffle 9 delimit anteriorly the burner and separate it from the combustion chamber.

By comburent a gaseous fluid containing oxygen is meant.

The temperature of the recycling flue gases in the annular duct 12 preferably ranges from 1000° C. to 1500° C., depending on the load and on the heating conditions of the combustion chamber.

The comburent is generally selected from atmospheric air, enriched air, oxygen and technical oxygen. Preferably the comburent is atmospheric air. The use of atmospheric air as the comburent under atmospheric pressure or to pressures slightly higher than the atmospheric one, preferably up to 0.2 bar, more preferably up to 0.15 bar, is an advantage of the present invention with respect to the prior art. If desired, a pressurized comburent can also be used.

The atmospheric air contains on the average (% by volume on the dry), 78.09% nitrogen, 20.95% oxygen 0.93% argon, 0.039% $CO_2$, and lower amounts of other gases. Atmospheric air can also contain a variable amount of water vapor, generally of the order of 1%.

Enriched air is generally atmospheric air containing a higher percentage of oxygen, higher than 20.95% up to about 55% by volume, the difference to 100% being formed of one or more inert gases, for example nitrogen.

By technical oxygen a mixture of oxygen with an inert gas is meant, wherein oxygen has a percentage by volume higher than 80%, even 90%. Oxygen having a titre 92-94% VSA (vacuum swing absorption) and 88-92% VPSA (vacuum pressure swing absorption) can also be used, the complement to 100 being formed of inert gases and/or nitrogen.

As said the preferred comburent is atmospheric air, as its use allows to improve the efficiency of the ejector 1 with a consequent increase of the recycling flue gas flow rates. In this way flow rate ratios recycling flue gas/comburent in the ranges indicated in the process of the present invention are obtained so that the use of recycle fans is not requested. This is an advantage as it allows to avoid investment and consumption costs related to the use of said recycle fans, that should be also operated at the high temperature conditions of the recycling flue gases. This would also require specifically designed fans.

The preferred fuels are liquid and/or gaseous fuels. Solid fuels, for example hydrocarbons, obtainable in a liquid form or in gaseous state at the operating conditions of the combustion process of the invention, can also be used.

Examples of gaseous fuels that can be used are hydrogen, natural gases, refinery gases, propane, hexane, pentane, butane.

As liquid fuels diesel oils, methanol, oil No. 2, petrols can be mentioned.

FIG. 3 illustrates in particular the radial ducts 14 conveying the comburent from the inlet 3 into the annular distribution chamber 13 and ultimately to the tubes 1a forming injector 1.

It is a further object of the present invention a process for operating the burner of the invention wherein a MILD (Moderate and Intense Low oxygen Diluition) combustion or flameless combustion takes place, comprising the following steps: suction of the recycling flue gases directly from the combustion chamber by means of an ejector fed with the comburent; heating of the comburent by thermal exchange with the recycling flue gases; direct injection of the fuel into the recycling flue gases by one or more injection systems; formation of a fuel-recycling flue gas-comburent mixture; introduction of the mixture into the combustion chamber.

The Applicant has unexpectedly and surprisingly found that by operating the burner of the present invention with the above process a high efficiency combustion is obtained combined with very low pollutant concentrations in the flue gases outletting the burner, in particular CO and $NO_x$, lower than those found in the combustion flue gases of the prior art burners. As a matter of fact by using gaseous fuels the emissions of $NO_x$ are lower than 10 ppmv (parts by million by volume) and of CO lower than 20 ppmv. By using liquid fuels CO and $NO_x$ emissions are at least 3-4 times lower than those obtained under the same conditions with a flame burner of the prior art, for example when operating at the same power conditions and using the same fuel and comburent. See the examples.

This shows that by operating the burner of the present invention according to the above described combustion process quite unexpected and surprising results are obtained, as indicated above, with respect to the above mentioned prior art.

In FIG. 4a the process of operating the burner of FIG. 1 is schematically illustrated, which comprises the following steps:
a) the recycling flue gases are directly sucked from the combustion chamber, see the grey arrows, into the annular duct 12, driven by the comburent outletting ejector 1,
b) heat exchange between the recycling flue gases and the comburent,
c) injection of the fuel by means of the injection systems 5 and/or 8 directly into the flue gases inside or outside a transit chamber 2, see the black arrows,
d) formation of a mixture fuel-recycling flue gases-comburent, the comburent being injected into the burner by injector 1, see the white arrows,
e) inlet of the mixture into the combustion chamber.

In step a) the comburent is the entraining or driving fluid and the recycling flue gases, or combustion fumes, are the entrained fluid.

In step b) the comburent flow is in countercurrent with respect to the inletting flue gases flowing into the annular duct 12.

The injector 1 is arranged in the burner in a different position with respect to the injection systems 5 and 8.

FIG. 4 represents the process of the present invention applied to the burner of the preferred embodiment of FIG. 2.

In the Figure it is shown that the recycling flue gases enter the burner through the suction intakes 7, see the grey arrows, sucked by the depression created by the flow of the comburent outletting the injector 1, they flow through the annular duct 12 and heat by thermal exchange the comburent that, entering through the radial ducts 14, flows in countercurrent with respect to the recycling flue gases into the annular distribution chamber 13, then they enter into the transit chamber 2 and downstream the inletting front section of injector 1 they mix with the comburent; the fuel being directly injected into the recycling flue gases by the injection system 5 and/or the injection system 8, see the black arrows.

FIG. 4b represents the process of operating a burner of FIG. 2a when both the injection systems 5 and 8 are used. The Figure illustrates also the injection system 5 with the relevant fuel adduction flanges 6 (see also FIG. 2a). In the Figure the feeding system of the comburent and the comburent flow inside it are shown in detail, see the white arrows.

As said, preferably in the process of the invention the fuel is fed through the injection system 5.

More in particular when to the burner gaseous fuels are fed, either the injection system 5 or the injection system 8 can be used, optionally both; when feeding liquid fuels preferably injection system 5, optionally injection system 8, are used.

To the burner of the present invention a liquid fuel and a gaseous fuel can be simultaneously independently fed, the liquid fuel being preferably injected through the injection system 5, the gaseous fuel preferably through the injection system 8.

The Applicant has surprisingly and unexpectedly found that in this way it is possible to obtain still higher temperatures near the suction intakes 7 of the recycling flue gases. This facilitates the substantially instantaneous evaporation of the liquid fuel injected through the injection system 5.

Inside the transit chamber 2 an uniform flow rate field of the recycling flue gases is formed, leading to the formation of a gaseous mass formed of the fumes and the comburent in the zone of the outletting front section of injector 1 that results substantially homogeneous in all its points.

The same happens also when the fuel is injected through the injection system 5.

It has been surprisingly and unexpectedly found by the Applicant that the combustion reaction that takes place at the level of the fuel injection system 8 does not show dishomogeneity both as regards the temperature and the concentration of the reactants and it is substantially uniform in all the points of the gas flow. Furthermore there are no thermal peaks or colder zones, in the gaseous mass outletting the burner (cone 11), as both the fuel and the comburent are preheated before being injected into the gas flow by flowing respectively, into the tubes (see above) of the injection system 8 and for the comburent into the radial ducts 14 the annular distribution chamber 13, the tubes 1a forming ejector 1.

Surprisingly and unexpectedly it has been found by the Applicant that in the burner of the present invention it is possible to obtain a combustion reaction balance near to the stoichiometric, or stoichiometric, by suitably adjusting the respective flow rates of the comburent and of the fuel. In particular the comburent is fed in amounts equal to the stoichiomeric or slightly higher than the stoichiometric, so as to have an amount of oxygen in the combustion flue gases (comburent excess), as % by volume on the dry, generally equal to or lower than 1.2% when using liquid fuels and lower than 0.4% when using gaseous fuels. This means that the amount of energy being lost at the stack is rather low and reduced to minimum values. The flow rates of the comburent and of the fuel can be controlled by operating on the relevant feeding pressures. This represents an advantage with respect to conventional burners that show oxygen concentration values in flue gases of the order, as said, as a minimum of 1.6% by volume and more generally of at least 3%. In fact when in the prior art burners combustion was operated by using oxygen concentrations near the stoichiometric, very high emissions of CO, well above the limits set by the regulations on fume emissions in force in Europe, were obtained.

When the fuel is injected upstream the injector 1 through the injection system 5, in the transit chamber 2 the recycling flue gases mix with the fuel at the gaseous state, but no combustion takes place.

This embodiment is preferably used with liquid fuels, as the presence in the transit chamber 2 of recycling flue gases at high temperature, for example a temperature comprised between 850°-1050° C., facilitates an almost instantaneous transition of the liquid fuels to the gaseous state. It has been found that in this way also when feeding liquid fuels through the injection system 5 it is possible to form an uniform flow rate field of the gases inside the transit chamber 2 and obtain a gaseous mixture that is homogeneous when it reaches the outletting front section of injector 1, so that thermal peaks or colder zones are not produced.

This allows to obtain remarkable advantages with respect to the conventional burners wherein, as known, the combustion of liquid fuels yields noticeable amounts of polluting substances. On the contrary, as said, in the case of the process of the present invention also by using liquid fuels the amounts of CO and $NO_x$ outletting the combustor with the flue gases are very reduced. Besides it is not necessary to provide a dedicated machinery such as fans for the recycling of the flue gases, or for preheating the feedings, also when using liquid fuels. Furthermore, as said, in the burner of the present invention also atmospheric air can be used with outstanding economic benefits.

The flow rate ratio between recycling flue gas/comburent, as percent by volume preferably ranges from about 30% up to about 60%, more preferably from 40 to 45%. With the burner of the present invention it is also possible to obtain a ratio between these flow rates reaching 100% when using a recycling fan.

The injection pressures for the gaseous and liquid fuels used in the burner of the present invention are those known in the prior art burners.

The comburent is injected in the injector 1 at a pressure preferably comprised between 1,000 and 15,000 Pa.

Surprisingly and unexpectedly it has been found by the Applicant that in the burner of the present invention even when lowering the load from the maximum load (100% load) to the minimum load as generally used in industrial applications (20-15% load), it is not requested to increase the excess air needed to maintain combustion. Therefore in the burner the same combustion conditions near to stoichiometric/stoichiometric (comburent excess in combustion fumes lower than the limits above set forth) of the maximum load are maintained also at low loads.

Surprisingly and unexpectedly it has been found by the Applicant that by using ejector 1 formed by the set of tubes 1a the mixing between the comburent and the gaseous phase coming from the transit chamber 2 is very efficient. It has been found by the Applicant that by using ejector 1 the comburent excess needed for combustion is very reduced and lower than the limits above set forth.

At the start of the burner operation, the fuel is preferably injected through the injection system 8 and then, when the burner operates in steady conditions the injection system 5 and/or injection system 8 is/are used.

It is a further object of the present invention the use of the burner of the present invention to operate industrial steam generators to produce process steam or electric power by using the process described above for operating the burner.

The following examples are given for illustrative purposes only and they do not limit the scope of the present invention.

EXAMPLES

Air Excess

The air excess as % by volume is defined by the following formula:

$$[(W_{combustion\ air}/W_{stoichiometric\ air})-1)]\times 100$$

wherein $W_{combustion\ air}$ is the air flow rate actually used and $W_{stoichiometric\ air}$ is the air flow rate required for the stoichiometric balance of the combustion reaction.

Example 1

A combustion process is carried out in a burner according to the present invention as represented in FIG. 2a and connected to an industrial refractory boiler. The burner is used at 100% of its thermal power (100% load). The fed fuel is natural gas (% by volume about 95% methane, 2.5% ethane, 0.2% propane, 0.06% butane, 0.02% of a mixture of pentane+$C_{10}H22$, 1.6% nitrogen, 0.7% $CO_2$, $H_2O$ traces and $H_2S$). The comburent is atmospheric air at room temperature.

The air feeding pressure is of 12,000 Pa. The gaseous fuel is fed through the injection system 8, downstream of the injector 1. The fuel feeding pressure is 250,000 Pa.

The air excess is 1.5%. The oxygen contained in flue gases is 0.3% by volume, calculated on the dry gas. The temperature of the flue gases outletting the boiler is 1320° C.

The ratio by volume recycled flue gases/comburent is 45% The stack emissions of CO are ≤20 ppmv and $NO_x$ ≤10 ppmv.

Example 2

Example 1 is repeated but the injection of the natural gas is carried out through the injection system 5, upstream of the injection section 1.

The stack emissions of CO are ≤10 ppmv and $NO_x$≤10 ppmv.

Example 3 Comparative

A prior art conventional flame combustion burner is used (see FIG. 5). The burner is used at 100% of its thermal power. The fuel and the comburent used are the same as in example 1.

Air feeding pressure is 2,000 Pa. The fuel is fed at the pressure of 200,000 Pa.

Air excess is 10%. The oxygen in flue gases is 2% by volume on the dry gas. The temperature of the flue gases outletting the boiler is 1300° C.

The stack CO emissions are comprised between 50 and 100 ppmv and $NO_x$ emissions from 90 to 130 ppmv.

Example 4

The combustion process is carried out in a burner according to the present invention connected to an industrial boiler. The burner is used at 100% of its thermal power. Fuel oil is used having a nitrogen content of 0.2% weight. The comburent used is the same as in example 1.

Air feeding pressure is 12,000 Pa. The fuel is fed through the injection system 5, upstream of the injection section 1. Fuel feeding pressure is comprised between 10 and 15 bar (10,000-15,000 KPa). The air excess is 5%. The oxygen contained in the flue gases is 1% by volume on the dry gas. The temperature of the flue gases outletting the boiler is of 1250° C.

The ratio by volume recycled flue gases/comburent is 42%. Stack emissions of CO are ≤40 ppmv and $NO_x$≤80 ppmv.

Example 5 Comparative

A conventional prior art flame combustion burner as shown in FIG. 5, previously described, is used. The burner works at 100% of its thermal power. The fuel and the comburent are the same as in Example 4.

Air feeding pressure is of 2,000 Pa. The fuel is fed at a pressure of 10-15 bar.

Air excess is comprised between 15 and 20%. The oxygen contained in flue gases is about 3-4% by volume on the dry gas. The temperature of the flue gases outletting the boiler is of 1230° C.

The stack emissions of CO are comprised between 70 and 170 ppmv and $NO_x$ emissions from 190 to 250 ppmv.

The invention claimed is:

1. A burner suitable for combustion under a moderate and intense low oxygen dilution (MILD) combustion, the burner comprising an annular duct for sucking the recycling flue gases directly from a combustion chamber by means of an ejector fed with a comburent, a heat exchange system suitable for heat exchange between the recycling flue gases and the comburent, systems for injecting the fuel directly into the recycling flue gases in a transit chamber, the recycling flue gases comprising or not comprising the comburent and formation of a mixture of fuel-recycling flue gases-comburent in the zone around the outlet of the comburent ejector and following introduction of the mixture into said combustion chamber,
- wherein the ejector is formed of tubes, which are parallel in their outletting parts, and an outlet cone of the burner,
- wherein the systems for injecting the fuel comprise a first injection system and a second injection system,
- wherein the fuel is injected into the transit chamber through the first injection system and when the fuel is a liquid, a transition to a gaseous state takes place, wherein no combustion takes place in the transit chamber, and wherein the annular duct, the heat exchange system between flue gases and comburent and the transit chamber are coaxial with respect to the longitudinal burner axis.

2. The burner according to claim 1 further comprising suction intakes for sucking the recycling flue gas from said combustion chamber, a comburent annular distribution chamber, radial ducts, and a case; wherein
- the annular duct, which is in communication with said combustion chamber through the suction intakes, delimits externally and posteriorly the comburent annular distribution chamber, and said suction intakes are positioned at a front part of the annular duct, the annular duct having a rear part opposite to said front part;
- a front portion of the comburent annular distribution chamber is in communication with the ejector and a rear portion of the comburent annular distribution chamber is in communication with the radial ducts, and the comburent annular distribution chamber delimits the transit chamber externally;
- the transit chamber is anteriorly delimited by an outletting front section of the ejector and posteriorly by the wall formed by the case;
- the outletting front section of the ejector is perpendicular with respect to the comburent annular chamber that anteriorly is in contact with the outlet cone; the first fuel injection system is positioned on the back wall of the case of the burner upstream of the ejector; the second fuel injection system is positioned downstream of the outletting front section of the ejector; wherein the recycling flue gases, directly sucked from said combustion chamber through the suction intakes, flow through the annular duct and heat the comburent, wherein said recycling flue gases flow from the front part of said annular duct to the rear part of said annular duct, wherein the comburent flows from the rear portion of the comburent annular distribution chamber to the front portion of the comburent annular distribution chamber, wherein the recycling flue gases enter the transit chamber and, driven by the depression created by the comburent outletting the front section of ejector downstream of the outletting front section of ejector, mix with the comburent, the comburent being the entraining fluid and the recycling flue gases being the entrained fluid, the fuel being directly injected upstream of the ejector into the recycling flue gases by the first injection system and/or downstream of the outletting front section of the ejector by the second injection system into the comburent-recycle-flue gas mixture, wherein in the latter case the recycle flue gas containing already fuel when the first injection system is also used.

3. The burner according to claim 2 wherein the first injection system is suitable for feeding liquid fuels.

4. The burner according to claim 1 wherein the fed fuels are liquid fuels.

5. The burner according to claim 2 wherein the outlet cone, the suction intakes, the annular duct and the comburent annular distribution chamber are positioned circumferentially and longitudinally around the burner axis.

6. The burner according to claim 2 wherein the transit chamber and the ejector are positioned along the longitudinal axis of the burner.

7. The burner according to claim 2 wherein the tubes of the ejector comprise inlets connected to the fuel annular distribution chamber and radially positioned thereto, and the outletting parts of said tubes are parallel to the longitudinal axis of the burner with their outlets directed towards the outlet cone; said outletting parts of tubes being positioned axially and circularly with respect to the longitudinal burner axis.

8. The burner according to claim 2 wherein the second injection system is circularly positioned around the burner longitudinal axis and is placed at the end of tubes parallel to the burner axis; wherein the tubes extend from said back wall and longitudinally cross the transit chamber and the outletting front section of the ejector.

9. The burner according to claim 2 wherein the first injection system 5 is on the back wall of the case of the burner and is positioned on the burner longitudinal axis and circularly thereto.

10. The burner according to claim 2 wherein the case is refractory or ceramic lined in its inner part.

11. The burner according to claim 2 further comprising an adduction flange, an annular feeding drum of the comburent, and adduction flanges of the fuel to the first injection system.

12. The burner according to claim 11 wherein the case is formed of a muffle and a jacket; the muffle and the annular feeding drum being circularly and longitudinally positioned around the burner axis; the suction intakes being delimited externally by the muffle; the adduction flanges are positioned externally with respect to the back wall of the case of the burner, the flange providing the comburent inlet into the annular feeding drum connected to the fuel annular chamber through the radial ducts.

13. A burner according to claim 1 wherein the comburent is selected from atmospheric air, enriched air, oxygen and technical oxygen.

14. A burner according to claim 1 wherein the fuels used are liquid and/or gaseous, or solid fuels made liquid or gaseous under the operating conditions of the burner.

* * * * *